United States Patent
de Kok (10) Patent No.: US 6,829,538 B2
(45) Date of Patent: Dec. 7, 2004

(54) METHOD FOR SUPPRESSING SYSTEMATIC AMPLITUDE VARIATIONS

(75) Inventor: Robbert Jasper de Kok, Houston, TX (US)

(73) Assignee: WesternGeco, L.L.C., Houston, TX (US)

(*) Notice: Subject to any disclaimer, the term of this patent is extended or adjusted under 35 U.S.C. 154(b) by 0 days.

(21) Appl. No.: 10/128,087

(22) Filed: Apr. 23, 2002

(65) Prior Publication Data

US 2003/0200031 A1 Oct. 23, 2003

(51) Int. Cl.$^7$ .................................................. G01V 1/00
(52) U.S. Cl. ............................................. 702/17; 703/5
(58) Field of Search ....................... 702/14, 17; 367/43, 367/45, 27; 348/406.1; 703/5, 10; 324/334; 175/45

(56) References Cited

U.S. PATENT DOCUMENTS

| | | | | |
|---|---|---|---|---|
| 4,504,860 A | * | 3/1985 | Nicol et al. .............. | 348/406.1 |
| 4,594,693 A | * | 6/1986 | Pann et al. ................... | 367/43 |
| 5,067,112 A | * | 11/1991 | Meek et al. ................... | 367/43 |
| 5,677,892 A | * | 10/1997 | Gulunay et al. .............. | 367/38 |
| 6,094,620 A | | 7/2000 | Gasparotto et al. ........... | 702/14 |
| 6,594,585 B1 | * | 7/2003 | Gersztenkorn ............... | 702/14 |

FOREIGN PATENT DOCUMENTS

WO     WO98/20368     5/1998

OTHER PUBLICATIONS

Gary Hampson; *Relationships Between Wavefield Sampling and Coherent Noise Attenuation*, EAEG—56th Meeting and Technical Exhibition—Vienna, Austria, Jun. 6–10, 1994.

Shuki Ronan; *Handling irregular geometry; Equalized DMO and beyond*, Society of Exploration Geophysicists 64th Annual Meeting Expanded Abstracts, pp. 1545–1548, 2 Figs.

Necati Gülünay; *Acquisition geometry footprints removal*—SEG 1999 Expanded Abstracts; pp. 637–640, 7 Figs.

Peter F. Morse et al.; *Ground–roll suppression by the stack–array*, Geophysics, vol. 54, No. 3 (Mar. 1989), pp. 290–301, 16 Figs.

Gary Hampson; *The relationship between wavefield sampling and coherent noise attenuation in the CMP method*, 65th Annual International Meeting: Soc. of Expl. Geophys., pp. 939–941, 5 Figs.

Richard G. Anderson et al.; *Noise–adaptive filtering of seismic shot records*, XP–002252555, Geophysics, vol. 53, No. 5 (May 1988), pp. 638–649, 11 Figs.

Guy Duncan et al.; *Slowness adaptive F–k filtering of prestack seismic data*, XP–002252556, Geophysics, vol. 59, No. 1 (Jan. 1994), pp. 140–147, 6 Figs.

Binzhong Zhou et al.; *Wave–equation extrapolation–based multiple attenuation: 2–D filtering in the F–k domain*, Geophysics, vol. 59, No. 9 (Sep. 1994), pp. 1377–1391, 15 Figs.

* cited by examiner

*Primary Examiner*—John Barlow
*Assistant Examiner*—Victor J. Taylor
(74) *Attorney, Agent, or Firm*—Madan, Mossman & Sriram, P.C.

(57) ABSTRACT

A method for correcting seismic data for periodic distortion introduced by acquisition parameters by filtering modified unitary transform data. A vertical transform is applied to seismic data to obtain frequency-space seismic data. These data are decomposed into an amplitude component and a phase response component. The phase response component is saved for the inverse process. A horizontal transform is applied to the amplitude component of the F-X data to obtain modified transform data. Because this transformation is performed in the X direction, it is here also referred to as the horizontal forward Fourier transformation. A K filter based on the period of the energy to be suppressed or eliminated is applied to this F-K data. The K filter may be, for example, a notch filter or any suitable filter. The data are then inverted to obtain T-X data with distortion suppressed or eliminate.

20 Claims, 10 Drawing Sheets

METHOD FOR SUPPRESSING SYSTEMATIC AMPLITUDE VARIATIONS

FIELD OF THE INVENTION

This invention relates to the field of geophysical prospecting and, more particularly, to a method for processing seismic data

BACKGROUND OF THE INVENTION

Systematic contamination of seismic data stemming, for instance from sub-optimal acquisition efforts, can manifest itself as signal amplitude variations and as residual noise amplitude variations. Both forms of contamination are laterally correlated to their origin, most commonly the acquisition geometry. For cases where the shooting geometry causes the artifacts, they are referred to as acquisition footprints or imprints. Present algorithms use various techniques to reduce acquisition footprints. An approach disclosed in Morse, P. F. and Hildebrandt, G. F. (1989) Ground-roll suppression by the stack array, *Geophysics*, 54, No. 3, pp. 290–301, addresses the signal variation problem through correcting amplitudes, for instance by creating a uniform stack operator in seismic processing. However, as pointed out by Hampson, 1994, Relationship between wave-field sampling and coherent noise attenuation, 56th Annual Meeting of European Association of Geoscientists and Engineers, Abstracts Book, paper H054, array forming during processing can reduce the resolution and it is therefore better to acquire the data in an adequate fashion, but this increases the acquisition costs. A solution of Ronen, 1994, Handling irregular geometry: Equalized DMO and beyond, Society of Exploration Geophysicists 64$^{th}$ Annual Meeting Expanded Abstracts, pp. 1545–1548, makes use of a special DMO algorithm to even out amplitude variations.

The approach of Meunier, J. and Belissent, M., 1992 Reduction of 3D geometry-generated artifacts, 6th Venezuelan Geophysical Congress Abstracts, pp. 388–394, relies on the periodicity of the contamination. The algorithms in this group operate in a more suitable domain such as the wave-number (K) domain or most commonly the frequency-wavenumber (FK) domain, for example. Necati Gulunay, Acquisition geometry footprints removal, Society of Exploration Geophysicists 69$^{th}$ Annual Meeting Expanded Abstracts, pp. 637–640. However, algorithms operating in the FK domain have the drawback that imprint removal only works effectively on events that have a single and constant orientation or dip.

SUMMARY OF THE INVENTION

A method for processing seismic data for removing distortion from seismic data comprising applying a unitary transform to a decomposed transform component of seismic data to obtain an modified transform component. The modified transform component is filtered and the filtered data are inverted to obtain time distance (T-X) or depth distance (Z-X) seismic data

BRIEF DESCRIPTION OF THE DRAWINGS

The present invention and its advantages will be better understood by referring to the following detailed description and the attached drawings in which.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a method for suppressing systematic amplitude variations or other signal artifacts that may result from acquisition signatures which overcomes the above-described deficiencies of current methods. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

The purpose of the present invention is to provide a solution that is independent of the structural information in the seismic data, i.e. the algorithm should not need a-priori information of the corrupted reflections. The method addresses the amplitude variations of reflective events by using their repetitive nature and does this in a dip independent fashion. The method is less effective on the removal of residual noise imprints however.

The method is also ineffective on phase variations. If possible these variations should be removed either deterministically or adaptively. In a case of streamer depth variations for instance, the corresponding phase difference can be removed deterministically by using the actual depths that are recorded at various positions along the streamers.

The method can suitably be described using synthetic data from a simple model. These synthetic data will be presented at various stages in the process to explain and illustrate the method of this invention.

The preferred embodiment uses the Fourier transform, which is a unitary transform with advantageous properties for this method application. However, many other unitary transformations may be used. A unitary transform is a transformation of the form $$A'=UAU^*,$$

where $U^*$ denotes the adjoint operator (i.e. the transpose of a matrix in which each element is replaced by its cofactor).

Examples of other unitary transforms are well known in the art. Instead of using the Fourier transform for transforming the seismic data to a transform domain, another embodiment of the inventions use Haar transforms. Yet another embodiment of the invention uses the Haademard transform. These transforms are unitary transforms that would be known to those versed in the art. Yet another embodiment of the invention uses wavelet transforms. Wavelet transforms have the same structure as the Haar transform, but as shown by Yves Meyer, have the additional property that the corresponding expansion is differentiable term by term of the seismic trace is smooth. With any of these unitary transforms, the process of transformation, filtering, and suppressing unwanted signal artifacts may be carried out efficiently.

Figure 1A:
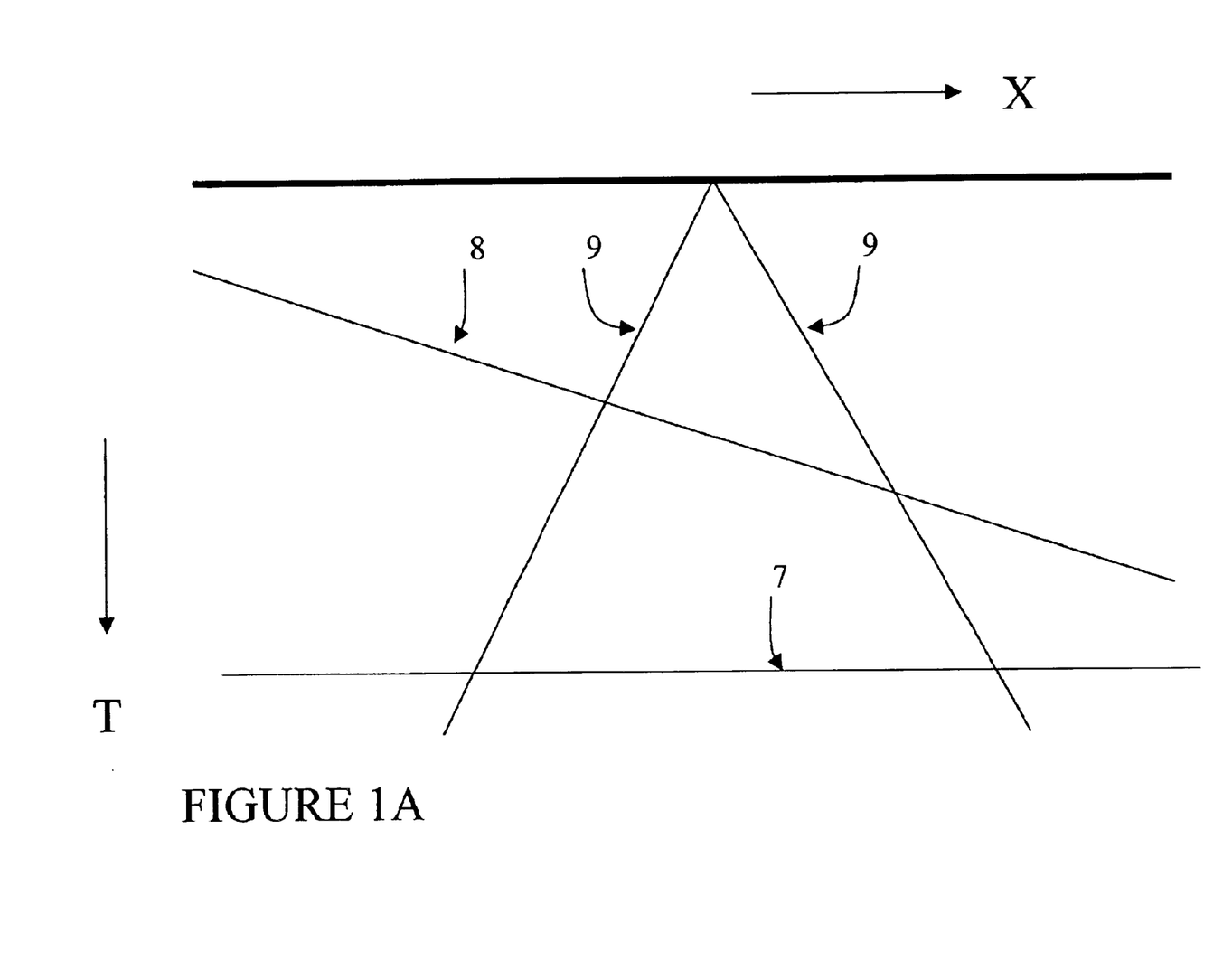
FIG. 1A illustrates a schematic seismic section in the time-distance domain.

FIG. 1A shows a schematic seismic section in the time-distance domain (T-X domain), representing a vertical slice through the Earth. For simplifying the schematic illustration, the seismic waveforms are not shown. A seismic section contains of a large number of time (T) dependent traces arranged side by side in the horizontal (X) direction. The seismic section contains the response from a horizontal seismic reflector 7, a response from a dipping reflector 8 and a response from a scattering obstacle at the Earth's surface 9.

Figure 1B:
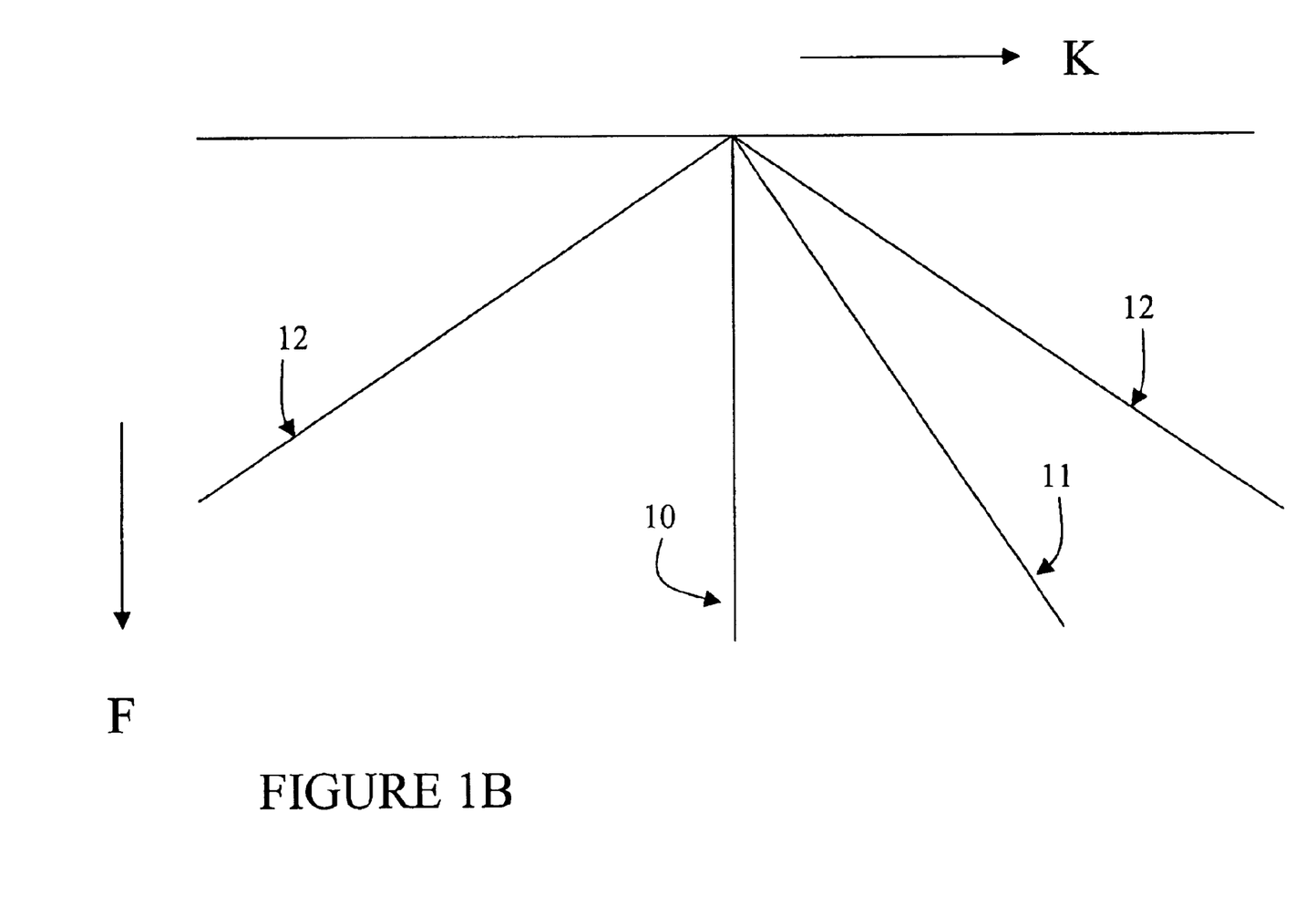
FIG. 1B illustrates a the Fourier transformation of FIG. 1A data to the F-K domain.

For illustration, the data are first transformed from the T-X domain to the F-K domain, for instance through the use of a Fourier transformation algorithm. The Fourier transformation of these data to the F-K domain produces the results as illustrated in FIG. 1B. Here, the energy from the horizontal reflecting interface is projected vertically onto the K=0 axis 10, while the dipping interface is projected on a line having an angle with the K=0 axis 11. The energy from a seismic scatterer projects as lines at yet another angle with the K=0 axis 12. This case illustrates one of the advantages of transforming the data to the F-K domain; While the scatterer interferes with the desired reflections in the T-X domain, there is full separation in the F-K domain, provided that aliasing is avoided. Unwanted energy can be surgically removed from the F-K domain and the inverse transformation can then be executed to restore the original data absent the interfering energy.

Let us now assume that the same section was shot using reduced acquisition efforts to produce a sub-optimal data set. Then the response may look like the section shown in FIG. 2A. The amplitudes are modulated laterally in a systematic fashion 5 as caused, for instance, by too coarse a 'roll along step' during data acquisition. A 'roll along step,' as is well known to those versed in the art, refers to the distance from one seismic source position to a subsequent source position. In this schematic example the variations are simplified to exhibit a boxcar type of modulation. The data after transformation to the F-K domain are depicted in FIG. 2B. In this case interference of the three events is present in the F-K domain and is even worse than in the original time-distance domain. Specifically, the horizontal event now projects its energy not only on the principal line 10 but also onto several repetitive lines of which only two repeats 20 and 30 are shown. The dipping reflector projects its energy onto lines 11, 21 and 31, while the scatterer maps onto lines 12, 22 and 32. Also for the dipping event and the scattering, more recurrences exist but only two repeats are shown. When comparing FIG. 2B with FIG. 1B, it can be concluded that the contamination has caused recurrent events 20, 21, 22, 30, 31 and 32 to intersect with the uncontaminated principal energy projected onto lines 10, 11 and 12. At the intersection points the repeated energy belonging to the contamination cannot be separated from the desired energy. In practice, intersections may be positioned anywhere in the F-K domain because seismic reflectors can have all possible dips ranging from −90 degrees to +90 degrees. Therefore, removal of the energy belonging to the scatterer 12, 22 and 32 is not feasible in the standard F-K domain without also removing energy belonging to desired events. It is also not possible to isolate and remove the energy belonging to the systematic contamination, that is, all energy that is repeated in the wave-number domain (in the K direction). This is because the repeated energy interferes with the principal energy 10, 11 and 12.

The present invention employs standard fast Fourier transformations as well as other methods that transform data from the time domain to the frequency domain and from the distance domain to the wave-number domain. The invention also employs a data decomposition and data reconstruction technique on the complex Fourier transformed data.

The forward process of the invention is referred to as the forward modified F-K transform while the reverse process is referred to as the inverse modified F-K transform. The modified F-K transformation process enables the isolation of the energy associated with systematic contamination.

Figure 3:
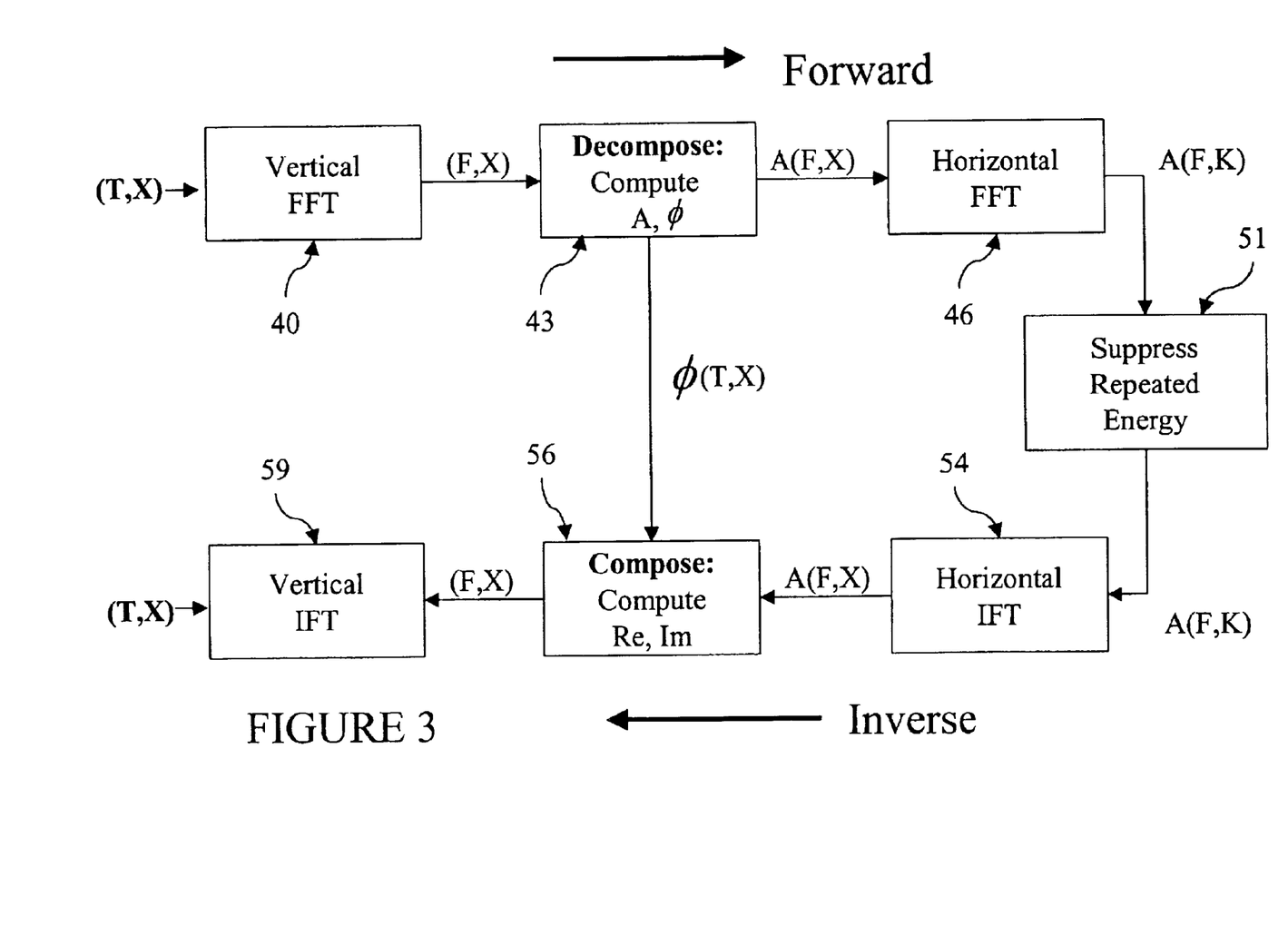
FIG. 3 illustrates a flow chart of the processing technique of the present invention.
Figure 4:
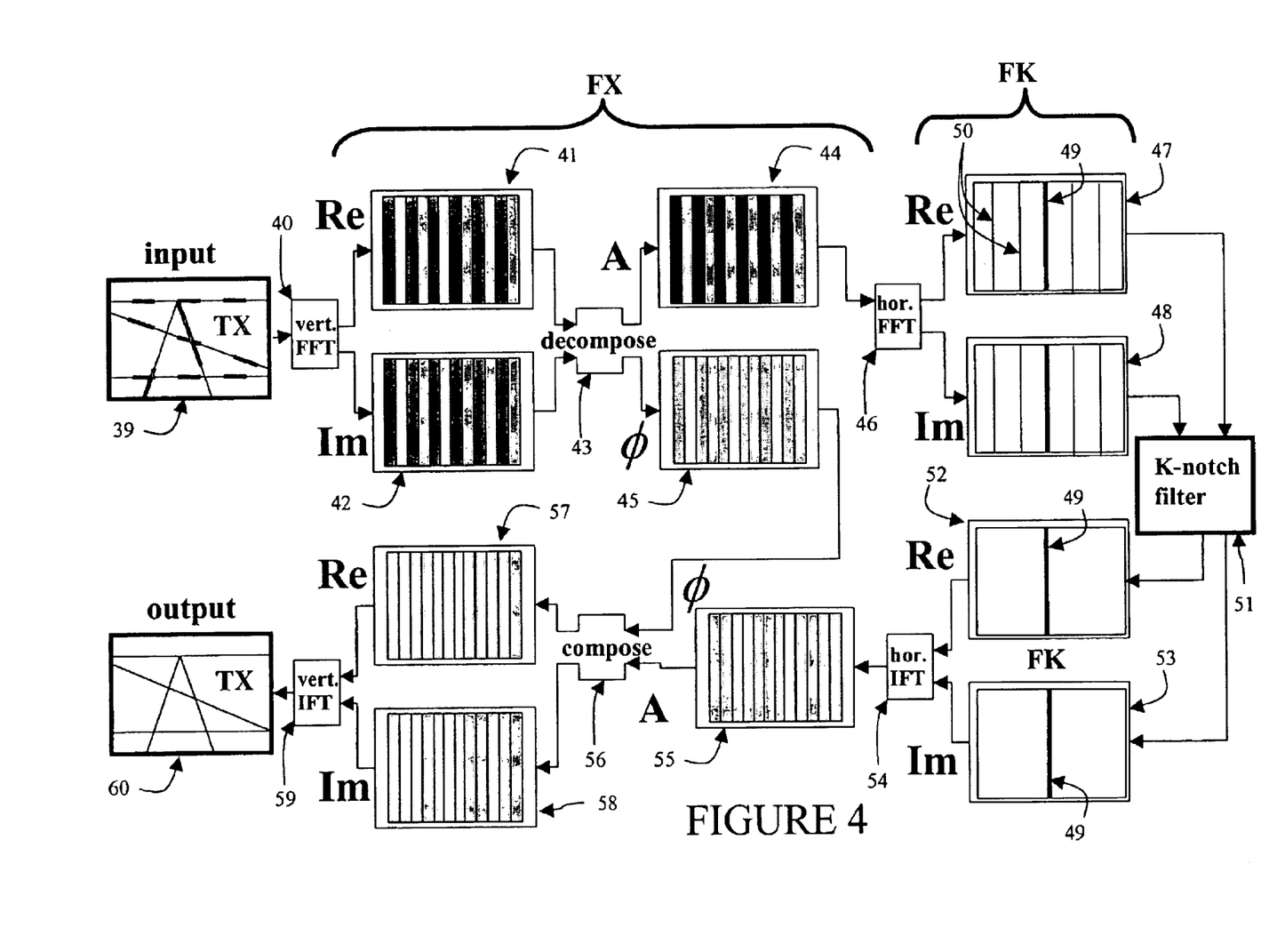
FIG. 4 illustrates a schematic of the data flow according to the flowchart of FIG. 3.

The processing technique of the present invention preferred embodiment uses a modified forward F-K transformation, suppression of systematic contamination and inverse modified F-K transform to convert data back to the original T-X domain. The process is illustrated in FIG. 3 and FIG. 4. The flow chart diagram in FIG. 3 shows the suite of process steps, while FIG. 4 additionally shows the flow of data through the processes. The FIG. 4 data panels, the schematic illustration input panel 39 and output panel 60 relate to the seismic response illustrated in FIG. 2a.

The forward modified F-K transform illustrated in FIG. 3 and FIG. 4 first uses a vertical unitary transform, the one-dimensional forward Fourier transform, or vertical FFT 40, to convert the input data from the T-X domain to the F-X domain. This transform is also referred to as the vertical forward transform because it acts along the time axis, which is vertically displayed on a standard seismic section. In the forward Fourier transform, the data are converted from real to complex numbers illustrated in FIG. 4 having a real part 41 and an imaginary part 42. The complex data are decomposed 43 into an amplitude and a phase component using the following formulae:

$$A = \sqrt{Re^2 + Im^2} \quad (1)$$

$$\phi = \tan^{-1}\left(\frac{Im}{Re}\right) \quad (2)$$

In formulae (1) and (2), 'A' is the amplitude, $\phi$ is the phase, 'Re' is the real part and 'Im' is the imaginary part of the complex data. In a manner analogous to Fourier transforms, other unitary transforms have decompositions corresponding to the basis functions of the particular transform.

Referring to FIG. 4, the amplitude component 44 is the amplitude spectra of the input traces. This amplitude spectra contains the undesired contamination and is therefore used for further transformation. The phase component 45, generally not affected or only mildly affected by the systematic contamination, is stored for later data reconstruction during the inversion sequence.

The next stage in the process is the forward Fourier transformation 46 of the amplitude component from the F-X domain to the F-K domain. Because this unitary transformation is performed in the X direction, it is called a horizontal transform, and in the preferred embodiment also referred to as the horizontal forward Fourier transformation. Being stripped of phase attributes, these data lose their dip association thereby rendering all events virtually horizontal. However, the process is fully reversible i.e., the amplitude data can be combined with the saved phase data 45 to restore the original input.

The seismic section as shown in FIG. 4 has now been transformed to the modified F-K domain and again includes a real part 47 and an imaginary part 48. In both the real 47 and imaginary part 48, the desired response 49 is separated from the undesired repeats 50 stemming from the contamination. Because all dipping events now behave like they were horizontal, they all project on the K=0 axis and all contamination energy projects fully separated onto parallel lines at discrete K values 50.

The process described in this invention works well when the Earth's amplitude spectra, i.e. the FX transformation of properly acquired data, have no significant variation in the X direction. This condition is satisfied, for instance, in the case that traces contain many reflections appearing randomly distributed in time (T). Then the corresponding trace spectra are wide and flat (also referred to as white spectra). Provided that the time window of recording is sufficiently long the Earth spectrum is white as a first approximation. However, in general, even without less ideal distributions of reflections, the condition of lateral amplitude continuity is sufficiently satisfied.

When dealing with systematic contamination, this constitutes the main lateral variations in F-X space. In the case of acquisition imprints, the amplitude changes periodically as a consequence of the roll along process in the field. Therefore the related energy will concentrate at constant fundamental wavenumbers and the harmonic values 50 thereof in the modified F-K domain. The related key condition is that the data have their phase values set to zero in the F-X domain. This also causes the energy of all events, including the systematic contamination, to be positioned symmetrically about the K=0 axis.

At this stage it can be concluded that there are two basic differences between the modified transform method and the standard F-K transform method. Firstly after applying the forward modified transform to obtain modified transformed seismic data, all events are stripped of their associated dip information; all events become virtually horizontal and their energy projects onto the K=0 axis. Secondly, after the forward modified F-K transform, the contamination projects at constant K-values positioned symmetrically about the K=0 axis.

As a result of the forward modified F-K transform, the fully isolated contamination projects from the desired energy and can simply be removed through the deletion of all corresponding K values 51. The suppression step 51 yields processed complex data having a real part 52 and an imaginary part 53 with energy mainly on the K=0 axis.

The subsequent processing sequence takes the data through an inverse modified F-K transform. The inverse modified F-K transform uses the inverse Fourier transformation (IFT) from F-K space to F-X space 54 yielding the processed amplitude component 55. The inverse modified F-K transform further uses a reconstruction process 56 that combines the saved phase data 45 with the processed amplitude data 55. In other words, the phase data 45 are composed 56 with the processed amplitude data 55. The resulting complex frequency spectrum includes a real part 57 and an imaginary part 58. The formulae for the reconstruction process, the 'compose' step are:

$$Re = A \cos(\phi) \quad (3)$$

$$Im = A \sin(\phi) \quad (4)$$

The last step in the inverse modified F-K transform involves application of an inverse Fourier transformation 59 of the reconstructed F-X spectra (i.e. the inverse composed data) to the original T-X domain 60. The result of the process 60 is that systematic contamination present on input 39 has been suppressed or eliminated.

The present invention is not limited to the application on time—distance arrays or seismic time sections, but it also applicable to vertical depth—distance arrays or depth sections where reflection time T has been converted to depth Z, for instance using depth migration techniques. In that case, the procedure remains identical with the exception that the vertical forward transformation converts from the depth domain (Z domain) to the vertical wave-number domain ($K_z$ domain) while the inverse vertical transformation converts the data from vertical wave-number domain back to the depth domain.

The application of the embodiment disclosed is illustrated in the synthetic T-X seismic data in FIG. 5 through FIG. 8. In these figures, the vertical axis time reference is delineated in sample number and the horizontal axis is delineated by arbitrary trace number.

Figure 5:
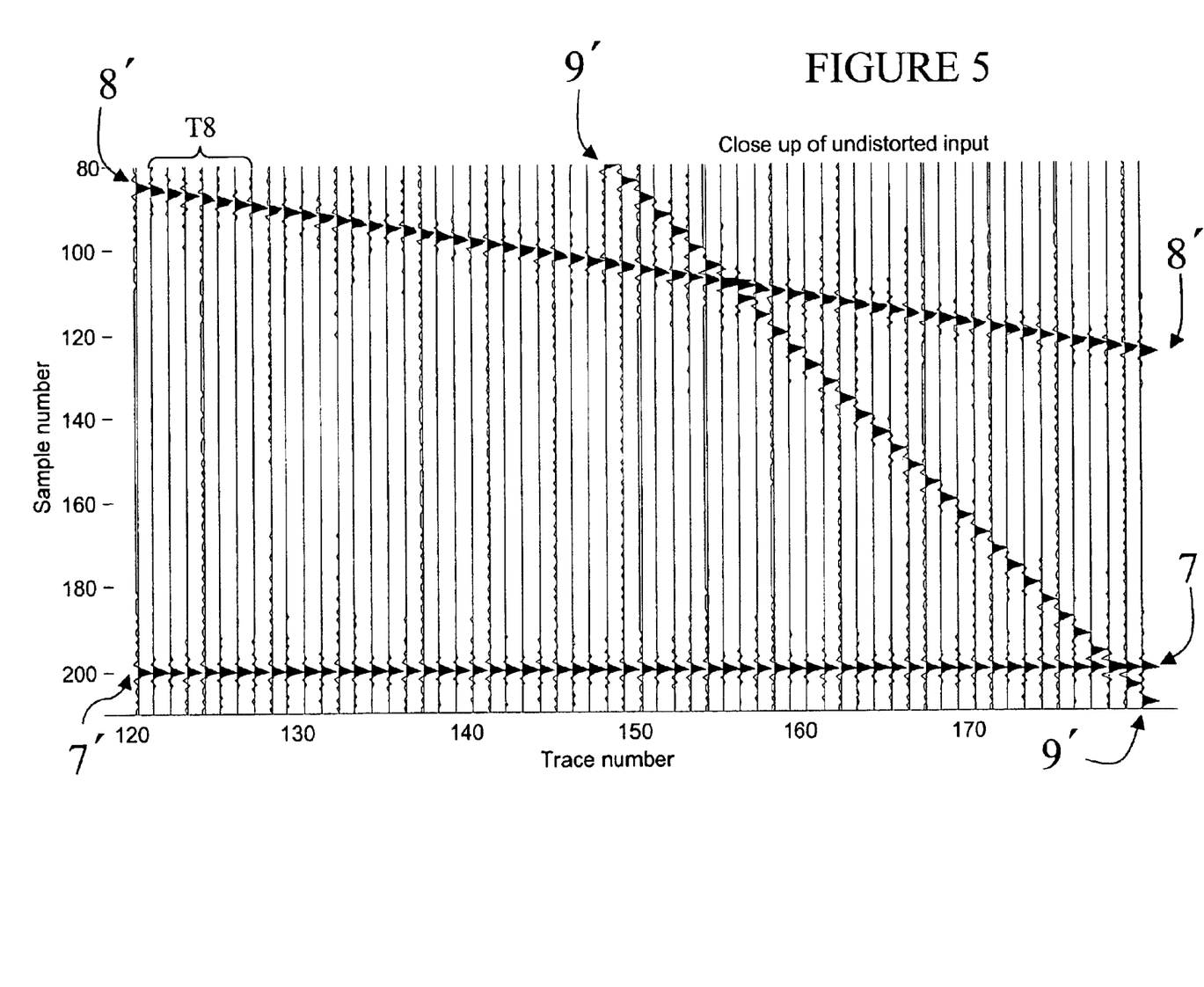
FIG. 5 illustrates a synthetic seismic section with undistorted seismic data.

FIG. 5 illustrates a synthetic data set similar to example schematic data of FIG. 1A. FIG. 5 shows a synthetic seismic section in the time-distance domain (T-X domain), representing a vertical slice through the Earth. A seismic section contains of a large number of time dependent traces arranged side by side in the horizontal direction. The seismic section contains the response from a horizontal seismic reflector 7', a response from a dipping reflector 8' and the response of a reflector 9' due to a scattering obstacle at the Earth's surface. FIG. 5 represents the response of seismic reflectors without distortion introduced by acquisition parameters.

Figure 2A:
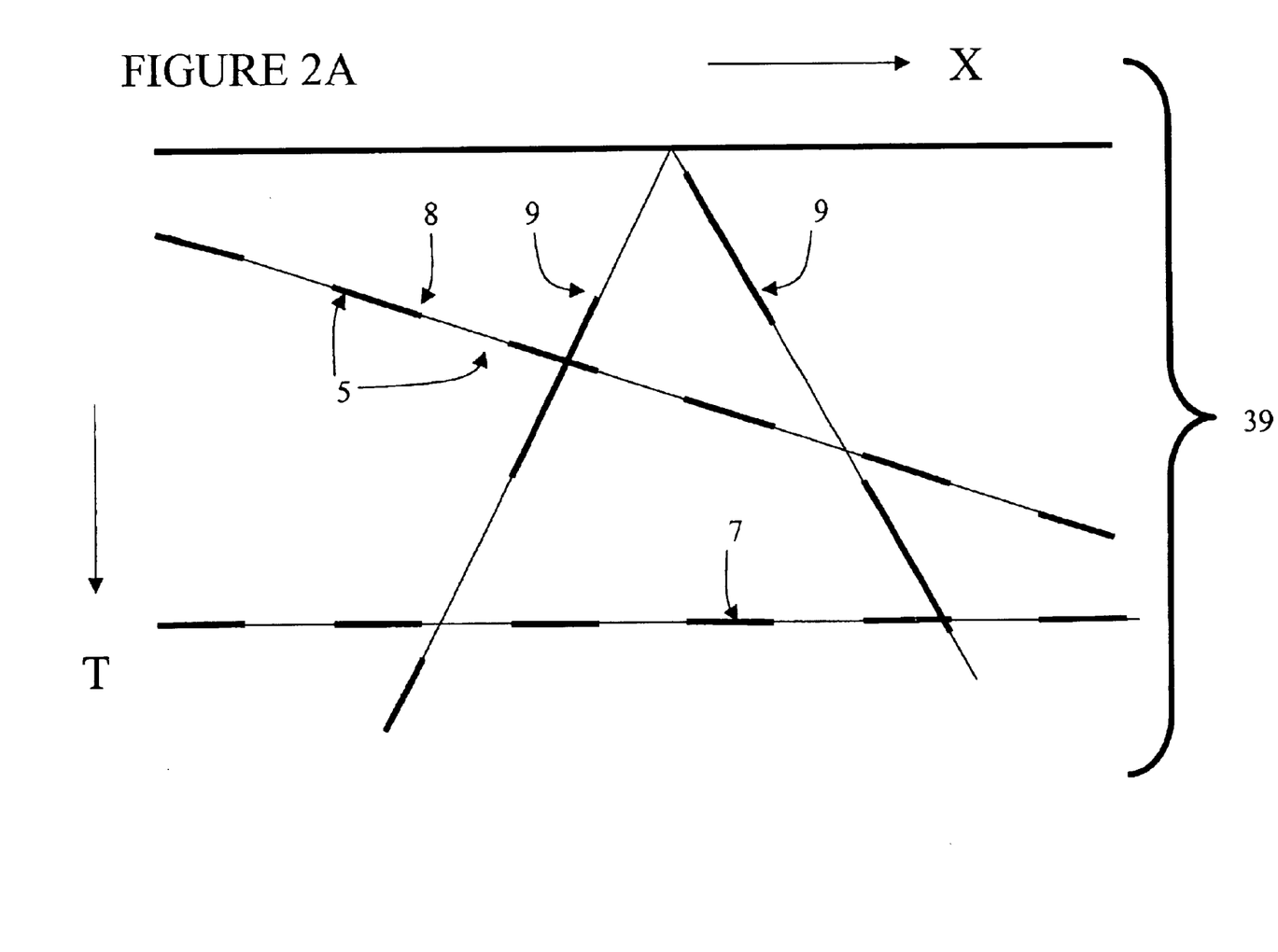
FIG. 2A illustrates a schematic seismic section in the time-distance domain acquired with sub-optimum acquisition parameters.
Figure 2B:
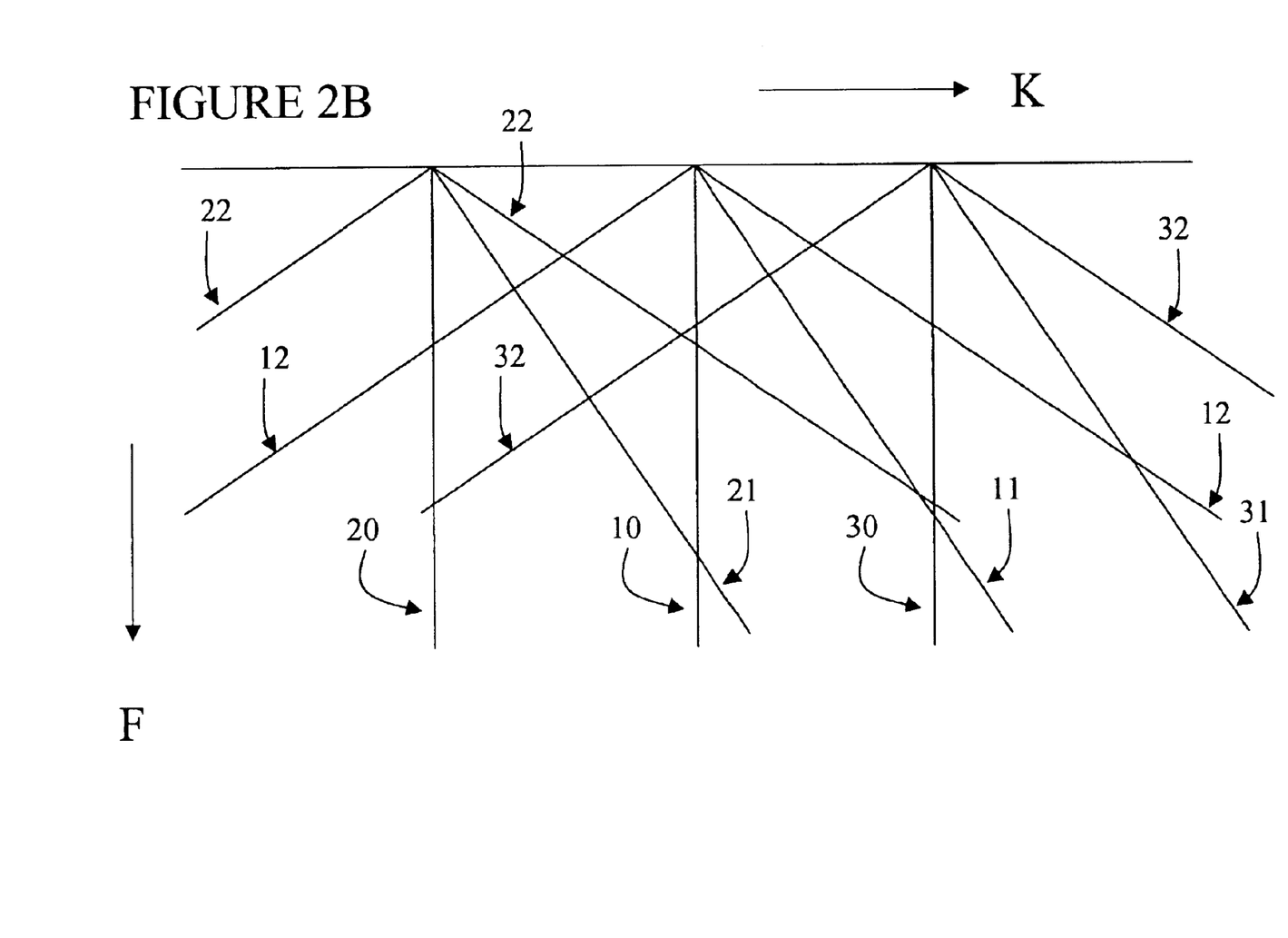
FIG. 2B illustrates the Fourier transformation of FIG. 2A data to the F-K domain.
Figure 6:
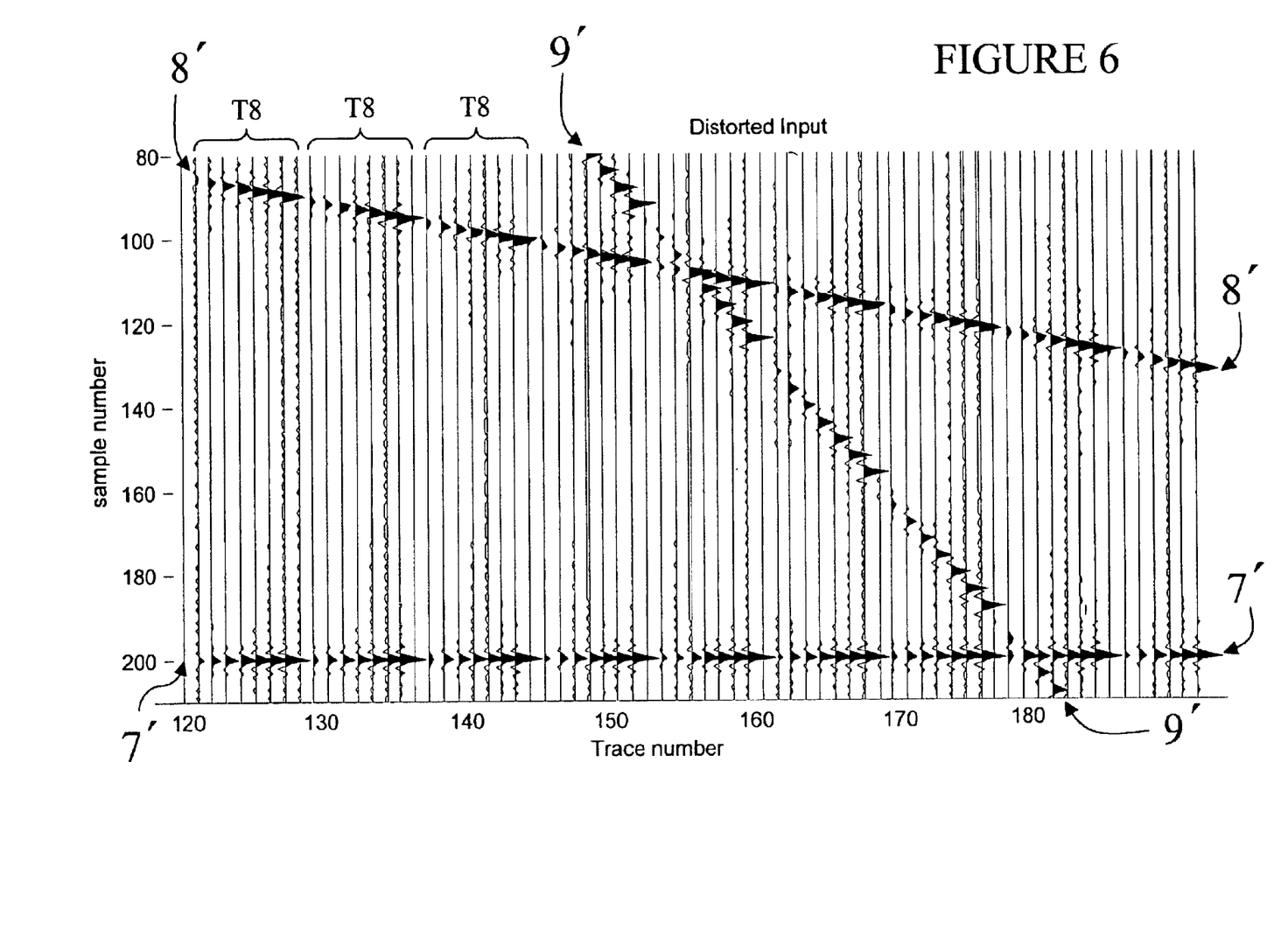
FIG. 6 illustrates a synthetic seismic section with distorted seismic data.

FIG. 6 illustrates the synthetic data similar to FIG. 5 except the input data is distorted similar to example schematic data of FIG. 2A, where an uneven source acquisition effort creates a distorted input data set. FIG. 6 shows a synthetic seismic section in the time-distance domain (T-X domain), representing a vertical slice through the Earth. The seismic section contains the response from a horizontal seismic reflector 7', a response from a dipping reflector 8' and an unwanted response from a scattering obstacle at the Earth's surface 9'. FIG. 6 represents the response of seismic reflectors with distortion introduced by acquisition parameters.

The FIG. 6 input synthetic data is systematically contaminated by a simulated roll-along step source effort equal to the distance between 8 traces as shown by T8 in FIG. 5, FIG. 6, FIG. 7, and FIG. 8. The FIG. 6 seismic data panel illustration is representative of input data 39 in FIG. 4. The distortion resulting from this periodic modulation will be apparent in the amplitude component of the FX domain data. After decomposition (43 of FIG. 3 and FIG. 4) the phase component of the data is stored for later use after filtering the amplitude component data according to the method of the present invention. At the same time, the phase component of the FX domain data will not contain the systematic contamination.

After transforming the data of FIG. 6 to the FK domain using the modified FK transform, the systematic contamination will project as vertical lines in FK space. The systematic contamination may then be suppressed or eliminated by applying a K filter corresponding to the periodicity.

Figure 7:
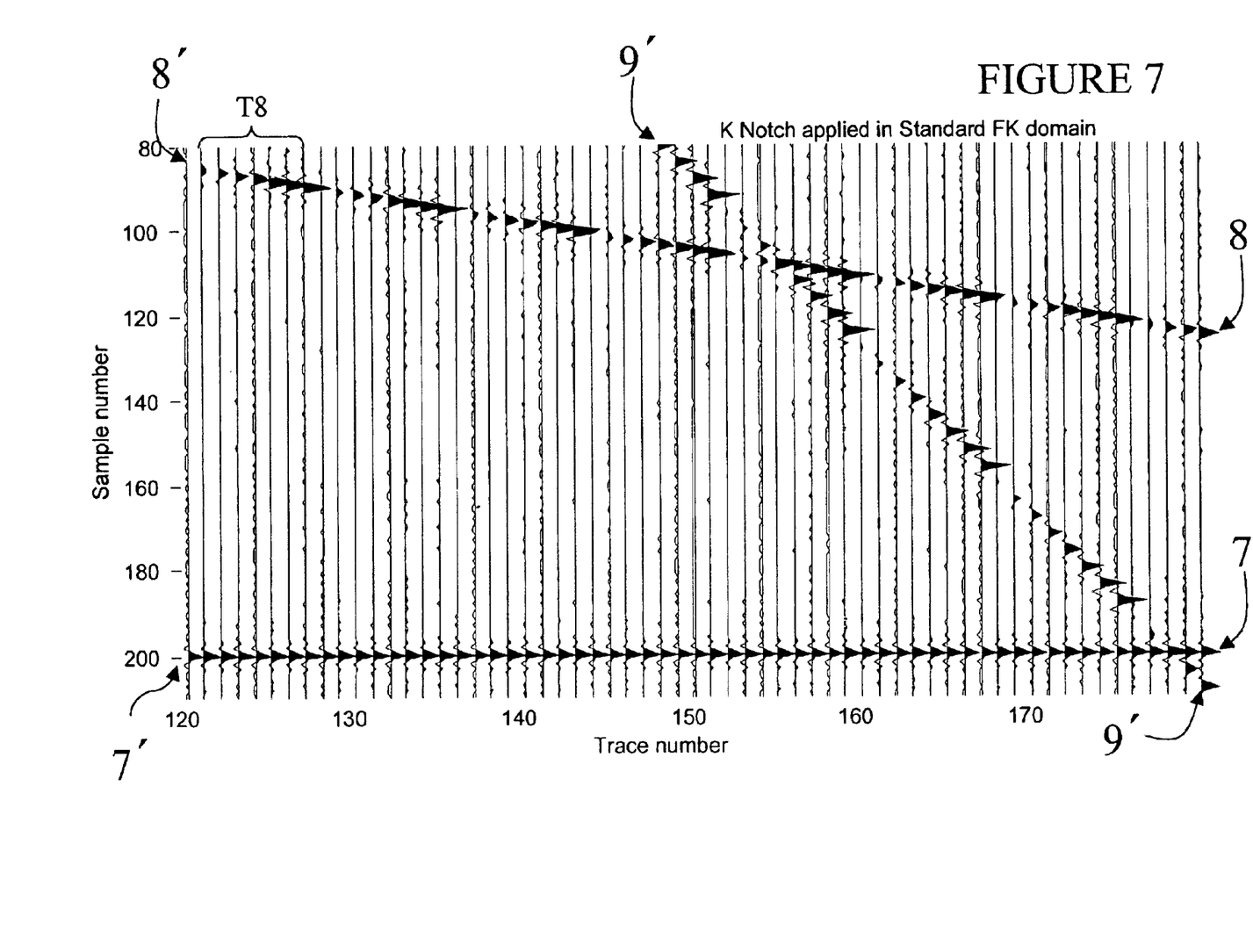
FIG. 7 illustrates a synthetic seismic section with standard prior art application of filtering to the seismic data of FIG. 6.

For comparison, FIG. 7 illustrates the application of prior art filtering methods with the standard FK transform to the distorted data of FIG. 6 where an uneven source acquisition effort has created a distorted input data set. FIG. 7 shows a synthetic seismic section in the time-distance domain (T-X domain), representing a vertical slice through the Earth. The seismic section contains the filtered seismic response from a horizontal seismic reflector 7'. The standard prior art filtering has removed the distorted data set response for horizontal seismic reflector 7' resulting in the desired laterally continuous reflection amplitude sequence of an even reflector response across the seismic section. However, the response of the non-horizontal reflectors, that is, the response from a dipping reflector 8' and a scattering reflector at the Earth's surface 9' remain unchanged.

Figure 8:
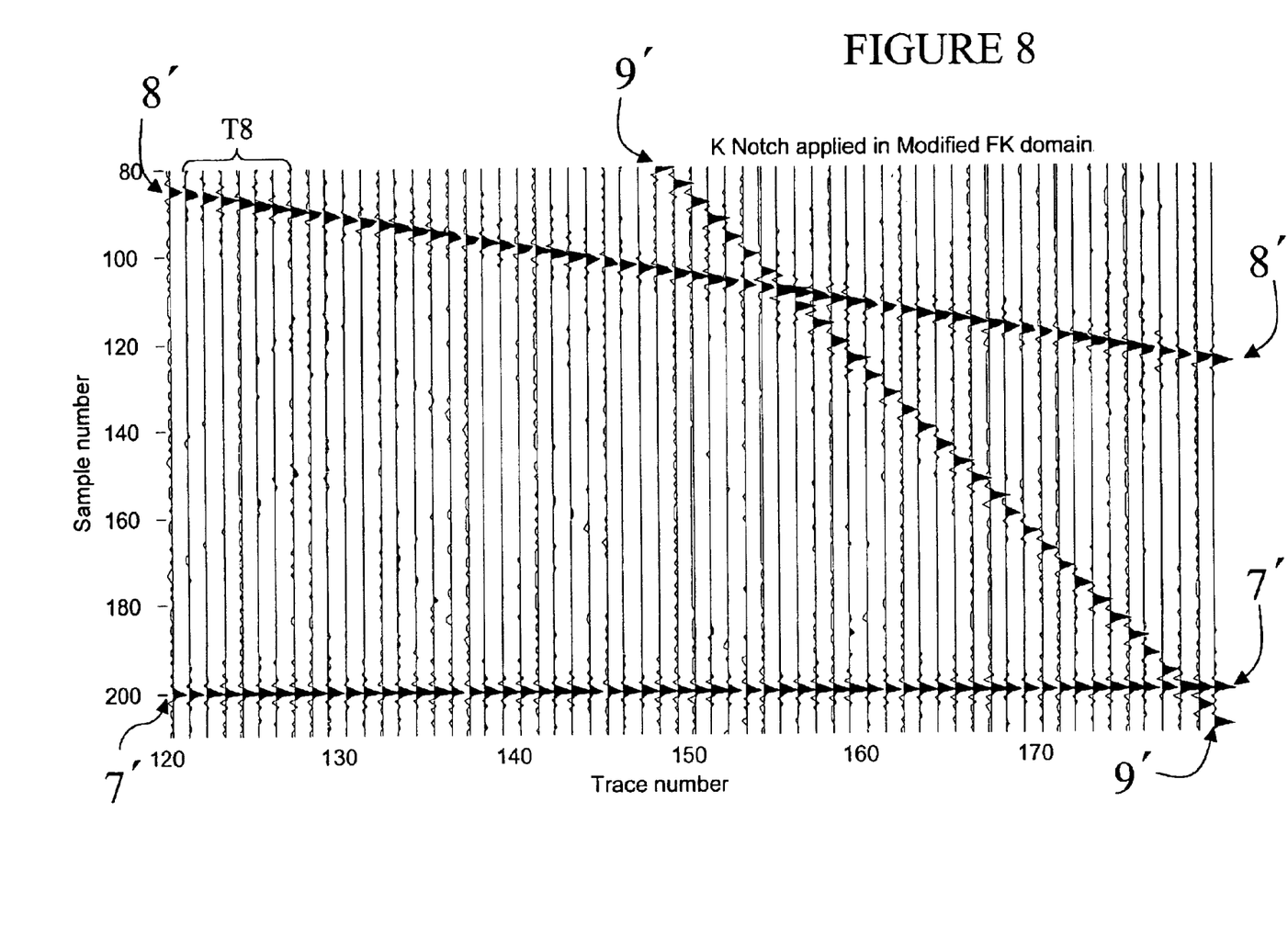
FIG. 8 illustrates a synthetic seismic section with application of the present invention to the seismic data of FIG. 6.

FIG. 8 illustrates the application of filtering with the modified FK transform of the present invention to the distorted data of FIG. 6 where an uneven source acquisition effort has created a distorted input data set. FIG. 8 shows a synthetic seismic section in the time-distance domain (T-X domain), representing a vertical slice through the Earth after the application of the present invention. FIG. 8 corresponds to the final data panel 60 representing data processed through the sequence shown in the flow diagram of FIG. 4. The FIG. 8 seismic section contains the filtered seismic response from a horizontal seismic reflector 7' where the standard prior art filtering has removed the distorted data set response resulting in an even reflector response across the seismic section. The response of the non-horizontal reflectors, that is, the response from a dipping reflector 8' and a scattering reflector at the Earth's surface 9' have also been corrected for distortion. In contrast to prior art methods, the correction results in even reflector responses for the dipping reflectors of the seismic section as well.

To summarize the preferred embodiment of this invention according to FIG. 3, seismic data may be corrected for periodic distortion introduced by acquisition parameters by applying a K filter to the amplitude component of seismic data in the FK domain. This is accomplished as shown in FIG. 3 by applying a vertical FFT 40 to T-X seismic input data that has a periodic distortion. The resulting F-X data are decomposed 43 into an amplitude component and a phase response component. The phase response component is 'saved' (43 to 56) for the inverse process to be performed later. A horizontal FFT 46 is applied to the amplitude component of the F-X data to obtain an amplitude component of the F-K data. Because this transformation is performed in the X direction, it is here also referred to as the horizontal forward Fourier transformation. A K filter based on the period of the energy to be suppressed or eliminated is applied 51 to this F-K data. The K filter may be, for example, a notch filter or any other appropriate filter.

After filtering the data are inverted 54, 56 and 59. The first inversion is the Horizontal FFT 54 where an amplitude component is obtained to compose 56 with the phase response component from the decomposition step at 43. The compose step 56 inversion output is then the input for the Vertical FFT 59 from which a T-X seismic section is obtained with data filtered to remove the distortion.

To summarize again the preferred embodiment of the present invention as disclosed according to the data flow diagram of FIG. 4, T-X seismic data may be corrected for periodic distortion introduced by acquisition parameters by applying a K filter to modified FK domain data. In the preferred embodiment a Vertical FFT 40 is applied to T-X input seismic data 39 resulting in real response 41 and an imaginary response 42. These responses are decomposed 43 into an amplitude response 44 and a phase response 45 using formulae 1 and 2 above. The phase response component is 'saved' (45 to 56) for the inverse process to be performed later. A Horizontal FFT 46 is applied to the amplitude component of the F-X data to obtain a real data response 47 of the amplitude response 44 and a imaginary response 48. Because this transformation 46 is performed in the X direction, it is here also referred to as the horizontal forward Fourier transformation. A K filter based on the period of the energy to be suppressed or eliminated is applied 51 to the modified F-K data 47 and 48. The K filter may be, for example, a notch filter or any other appropriate filter. The data after filter application are the modified FK data real response 52 and imaginary response 53.

After filtering the data are inverted back to T-X data. The first inversion is the Horizontal FFT 54 where an amplitude component 55 is obtained to compose 56 with the phase response component 45 from the decomposition step at 43. The compose step 56 inversion output 57, 58 is then the input for the Vertical IFT 59 from which a T-X seismic section 60 is obtained resulting in seismic data filtered to remove the distortion. FIG. 8 is a example of a T-X data after processing with the present invention.

Persons skilled in the art will understand that the method for suppressing systematic amplitude variations described herein may be practiced on any type of data including but not limited to geophysical data such as seismic data and potential fields data. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method of processing seismic data comprising:
   (a) obtaining decomposed seismic data comprising one of i) an amplitude component of seismic data, and ii) a phase component of seismic data;
   (b) applying a horizontal unitary transform to said decomposed seismic data to give a first transformed component and a second transformed component, and
   (c) filtering at least one of the first and second transformed components independently of the other of the first and second transformed components.

2. The method of claim 1 wherein said horizontal unitary transform comprise a Fourier transform.

3. The method of claim 1 wherein said decomposed seismic data is in the frequency-space domain.

4. The method of claim 1 wherein said filtering further comprises applying a filter to form filtered component data in the frequency-wavenumber domain.

5. The method of claim 1 wherein said filtering further comprises applying an inverse transform to form inverse transformed data and composing said inverse transformed data with the other of the first and second transformed components to form inverse composed data.

6. The method of claim 5 further comprising applying an inverse transform to said inverse composed data to form T-X data.

7. A method for processing seismic data comprising:
   (a) obtaining decomposed seismic data comprising one of i) an amplitude component of seismic data, and ii) a phase component of seismic data;
   (b) applying a horizontal unitary transform to one component of said decomposed transformed seismic data independent of at least one other component of said decomposed transformed seismic data to obtain modified transformed seismic data; and
   (c) filtering said modified transformed seismic data.

8. The method of claim 7 further comprising inverting said filtered modified transformed seismic data to obtain T-X seismic data.

9. The method of claim 7 wherein said filtering further comprises applying an inverse unitary transform to give inverted modified transformed seismic data.

10. The method of claim 7 further comprising applying an inverse horizontal unitary transform to said filtered modified transformed seismic data to form inverse filtered component data and composing said inverse filtered component data with said at least one other component of decomposed transform data to form composed transform data.

11. The method of claim 10 further comprising applying an inverse transform to the composed transform data to form T-X seismic data.

12. A method of processing seismic data comprising:
   (a) applying a vertical unitary transform to seismic data to give a first transformed component and a second transformed component wherein said first and second transformed components comprise at least one of i) an amplitude component of seismic data, and ii) a phase component of seismic data;
   (b) applying a horizontal unitary transform to said first and second transformed components; and
   (c) filtering at least one of the transformed first and second transformed components independently of the other of the transformed first and second transformed components.

13. The method of claim 12 wherein the vertical unitary transform comprises a Fourier transform.

14. The method of claim 13 wherein (i) said seismic data is in the time-space domain, (ii) applying said Fourier transform further comprises transforming said data to the frequency-space domain, (iii) said first transformed component comprises amplitudes in the frequency-space domain, and, (iv) applying said horizontal unitary transform further comprises applying a Fourier transform to said first transformed component to give a third component in the frequency-wavenumber domain.

15. The method of claim 12 wherein said filtering further comprises applying a K filter to form filtered component data in the frequency-wavenumber domain.

16. The method of claim 15 further comprising applying an inverse horizontal transform to said filtered component data to form inverse horizontal transform data and composing said inverse horizontal transform data with the other of the first and second transformed components to form inverse composed data.

17. The method of claim 16 wherein the inverse composed data are inverse transformed to form T-X data.

18. A method for processing seismic data comprising:
   (a) applying a horizontal unitary transform to a decomposed seismic data to obtain modified unitary transform data, wherein said decomposed data comprises one of (i) and amplitude component of data, and, (ii) a phase component of data;
   (b) filtering said modified unitary transform data; and
   (c) inverting said modified unitary transform data to obtain T-X seismic data.

19. The method of claim 18 wherein inverting said modified unitary transform data further comprises applying at least one of i) an inverse horizontal unitary transform, and ii) an inverse vertical unitary transform.

20. The method of claim 18 wherein inverting said modified unitary transform data further comprises applying an inverse unitary horizontal transform to said modified unitary transform data to obtain inverted modified data and composing said inverted modified data with a decomposed phase component of seismic data to form T-X seismic data.

* * * * *